(12) United States Patent
VanLanen et al.

(10) Patent No.: US 8,109,485 B2
(45) Date of Patent: Feb. 7, 2012

(54) TILTING TELEVISION WALL MOUNT

(75) Inventors: Lee T. VanLanen, McKinney, TX (US); Douglas M. Galletti, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 578 days.

(21) Appl. No.: 11/748,002

(22) Filed: May 14, 2007

(65) Prior Publication Data

US 2008/0283694 A1 Nov. 20, 2008

(51) Int. Cl.
*A47F 5/00* (2006.01)

(52) U.S. Cl. .................. 248/371; 248/923; 248/276.1; 248/324

(58) Field of Classification Search ............ 248/917, 248/918, 291.1, 121, 126, 289.11, 447.1, 248/454–456, 398, 371, 923, 279.1, 299.1, 248/133, 447, 274.1, 276.1, 284.1, 280.11, 248/323–325; 16/327, 331, 332, 86 C; 403/82; 292/145, 147, 149, 155, 206, 212, 262, DIG. 15, 292/266, 277

See application file for complete search history.

(56) References Cited

U.S. PATENT DOCUMENTS

| | | | | |
|---|---|---|---|---|
| 427,341 A * | 5/1890 | Meyers | ........................ | 292/266 |
| 602,736 A * | 4/1898 | Duboeay | ........................ | 248/456 |
| 1,139,008 A * | 5/1915 | Abraham | ........................ | 292/266 |
| 1,195,871 A * | 8/1916 | Thompson | ........................ | 292/266 |
| 1,507,087 A * | 9/1924 | Rankin | ........................ | 292/266 |
| 1,662,048 A * | 3/1928 | Victorsohn | ........................ | 217/60 C |
| 1,836,053 A * | 12/1931 | Wagner | ........................ | 248/456 |
| 2,349,106 A * | 5/1944 | Mullan | ........................ | 15/265 |
| 2,749,144 A * | 6/1956 | Kayler | ........................ | 280/438.1 |
| 2,937,839 A * | 5/1960 | Randolph | ........................ | 248/276.1 |
| 3,029,548 A * | 4/1962 | Braha | ........................ | 248/455 |
| 3,574,340 A * | 4/1971 | Busche | ........................ | 248/285.1 |
| 3,905,573 A * | 9/1975 | Davis | ........................ | 248/445 |
| 4,925,240 A * | 5/1990 | Peters | ........................ | 297/161 |
| 5,139,223 A * | 8/1992 | Sedighzadeh | ........................ | 248/324 |
| 5,141,196 A * | 8/1992 | Arnold et al. | ........................ | 248/397 |
| 6,098,952 A * | 8/2000 | Tonn | ........................ | 248/688 |
| 6,431,511 B1 * | 8/2002 | Pfister | ........................ | 248/274.1 |
| 6,554,242 B2 * | 4/2003 | Kim | ........................ | 248/371 |
| 6,766,994 B2 * | 7/2004 | Serbinski et al. | ........................ | 248/371 |
| 6,796,540 B1 * | 9/2004 | Manceor | ........................ | 248/284.1 |
| 7,487,940 B2 * | 2/2009 | Saez et al. | ........................ | 248/176.1 |
| 2002/0033436 A1 * | 3/2002 | Peng et al. | ........................ | 248/284.1 |

* cited by examiner

*Primary Examiner* — Terrell McKinnon
*Assistant Examiner* — Ingrid M Weinhold
(74) *Attorney, Agent, or Firm* — Warren L. Franz; Wade J. Brady, III; Frederick J. Telecky, Jr.

(57) ABSTRACT

A display wall mount comprising a wall bracket configured to couple to a wall and having a first wall bracket edge, a display bracket configured to couple to the display and having a first display bracket edge, and a curvilinear bar moveably coupled between the first wall bracket edge and the first display bracket edge. The display bracket is moveably coupled to the wall bracket.

23 Claims, 4 Drawing Sheets

TILTING TELEVISION WALL MOUNT

TECHNICAL FIELD OF THE INVENTION

The present disclosure is directed, in general, to display wall mounts and, more specifically, to a tilting mount for a display.

BACKGROUND OF THE INVENTION

The field of high definition television (HDTV) currently has several entries offering different technologies to meet the demands of displaying up to 1080 progressively (1080p) scanned lines of data, among them: plasma, LCD (Liquid Crystal Diode), DILA (Direct drive Image Light Amplifier), and DLP® (Digital Light Processing). Many of these technologies have advanced to the point that the TV display unit is relatively thin by comparison to a conventional CRT, thereby making them suitable to be wall-mounted.

However, wall mounting brings with it inherent challenges. Of course, the combined weight of the display unit, hereinafter referred to simply as "TV" whether it comprises a tuner or not, and the mount must be within reasonable limits for the mounting hardware and the wall to support. Conventional mounting may be as simple as a flat wall mount wherein the face of the TV is parallel to the wall. Generally, this is not an acceptable result when one considers the price paid for the HDTV. For optimal viewing, the viewer usually wants the display to be normal to his/her line of sight. With an average viewer seated in a comfortable couch or chair, the viewer's eyeballs would be at about 38 inches above the floor. While it is most desirable from a viewing standpoint for the center of the TV to be located at this same height, this height, in most cases, would likely appear awkward as being too low to persons not seated in the viewers seating area when compared to the other wall furnishings. Therefore, it is routine to install such TVs at some height above the seated viewer's viewpoint. The center of the HDTV would likely be installed at about 67 inches above the floor. The Society of Motion Picture and Television Engineers (SMPTE) recommends a minimum viewing angle of 30 degrees for movie theaters. This appears to be becoming a de facto standard for front projection home theaters as well. Viewing from this distance, or closer, reportedly lessens eye strain caused by watching a smaller image in a dark room, and also results in a more "immersive experience." Accordingly, with a nominal 32" wide TV, the viewer should be at a distance of about 5 feet from the TV. At this distance between the HDTV and the viewer, with the center of the monitor at 67 inches above the floor, the upward viewing angle to the center is almost 18.5°. Thus, it would be helpful for optimal viewing to tilt the TV so as to be more perpendicular to the line of sight of the viewers. This is currently being accomplished with some wall mounts that typically hang from horizontal bars attached to the wall. In these units, the TV usually tilts around the horizontal centerline and may use any of several methods to adjust and lock the tilt.

Accordingly, what is needed in the art is a wall mount for a display that addresses the problems of conventional mounts.

SUMMARY OF THE INVENTION

To address the above-discussed deficiencies of the prior art, provided is a display wall mount comprising a wall bracket configured to couple to a wall and having a first wall bracket edge, a display bracket configured to couple to the display and having a first display bracket edge, and a curvilinear bar moveably coupled between the first wall bracket edge and the first display bracket edge. The display bracket is moveably coupled to the wall bracket. A method of manufacturing a display wall mount is also provided.

A disclosed embodiment of a display wall mount has a planar wall bracket for attachment to a wall and a planar display bracket for attachment of a display. The display bracket has a bottom edge pivotally attached to a bottom edge of the wall bracket for relative rotary movement of a display bracket top edge about a first hinge horizontal axis toward or away from a wall bracket top edge. A hinge is attached to the top edge of the wall bracket, and another hinge is attached to the top edge of the display bracket. A pin member pivotally attaches a first end of an arcuate bar to the wall bracket hinge for rotary movement of the bar about a first pivot pin axis relative to the wall bracket hinge. The attachment of the bar to the wall bracket hinge enables rotary movement of the bar about a second hinge horizontal axis relative to the wall bracket. A clamp assembly defines a channel which captures an intermediate portion between the first end and a stop pin at a second end of the bar during the relative rotary movement of the bar about the first pivot pin axis. The clamp assembly includes a manually settable clamping member in the form of a thumb screw for releasably securing the bar at a set angular position about the first pivot pin axis within the channel. Another pin member pivotally attaches the clamping assembly to the display bracket hinge for rotary movement of the clamping assembly about a second pivot pin axis relative to the display bracket hinge. The attachment of the clamping assembly to the display bracket hinge allows rotary movement of the clamping assembly about a third hinge horizontal axis relative to the display bracket. In the disclosed embodiment, the clamp assembly has upper and lower clamp blocks joined together by spacers in the form of threaded bolts which pass through bearings. The illustrated bar is a flat bar having planar upper and lower surfaces captured between the bearings and between correspondingly planar opposing surfaces of the upper and lower clamp blocks. In the illustrated embodiment, the first and second pivot pin axes are parallel to each other, and orthogonal to the first, second and third hinge axes.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Figure 1:
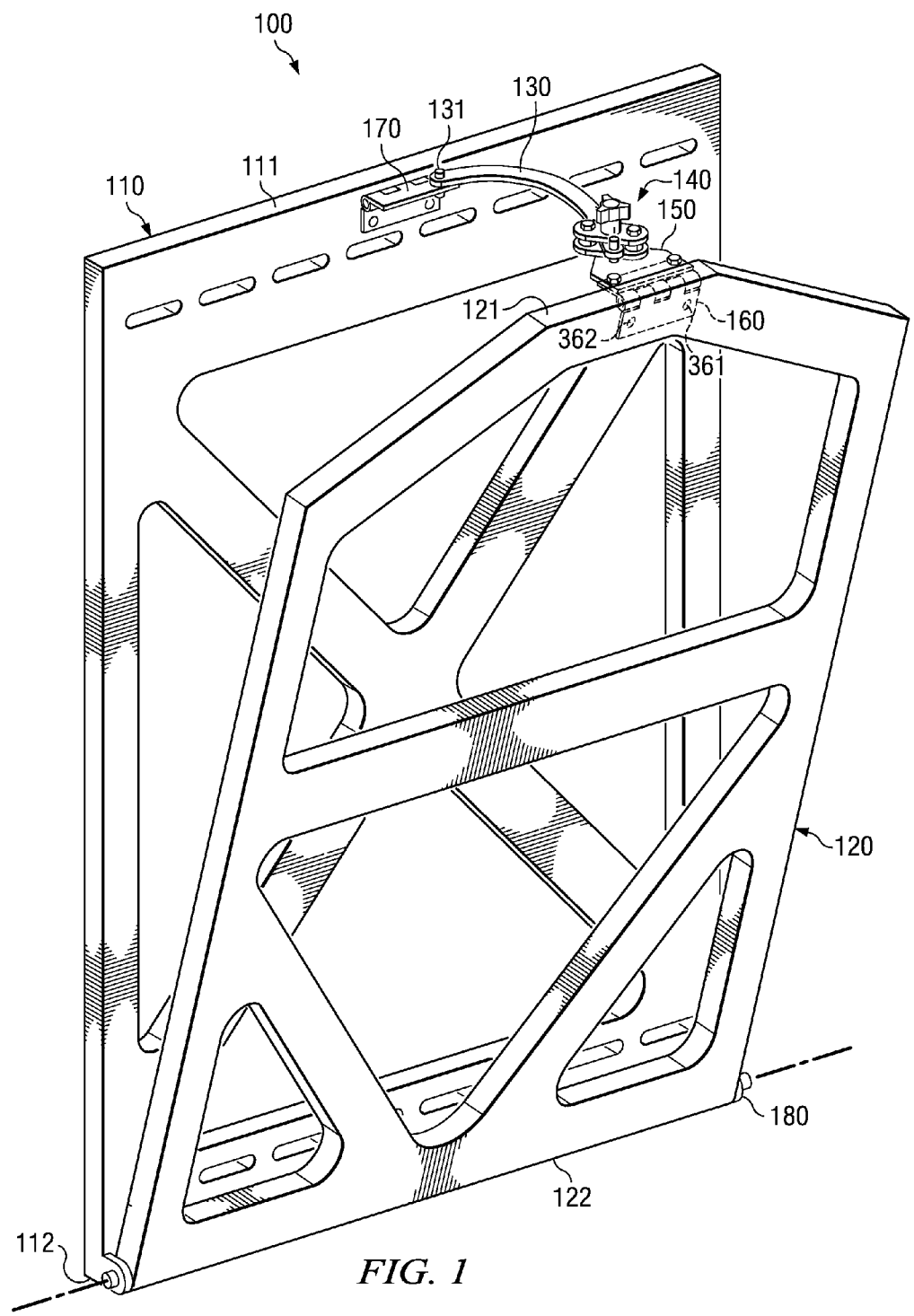
FIG. 1 illustrates a front, off-angle view of one embodiment of a display wall mount constructed according to the disclosure.

FIG. 1 illustrates a front, off-angle view of one embodiment of a display wall mount 100 constructed according to the disclosure. The wall mount 100 comprises a wall bracket 110, a display bracket 120, a curvilinear bar 130, a clamp 140, a clamp bracket 150, a first hinge 160, a second hinge 170, and a bracket hinge 180. The wall bracket 110 in one embodiment is configured to couple to a wall in a conventional manner; e.g., screws, molly bolts, wall anchors, etc. The wall bracket 110 has a first wall bracket edge 111, and a second wall bracket edge 112 distal the first wall bracket edge 111. The display bracket 120 is configured to couple to a display (not shown), in one particular embodiment, a flat panel television. Details of the mounting of the display to the display bracket 120 will be discussed below.

The display bracket 120 has a first display bracket edge 121, and a second display bracket edge 122 distal the first display bracket edge 121. The bracket hinge 180, which may be manufactured integrally with the display bracket 120 and the wall bracket 110, moveably couples the second wall bracket edge 112 and the second display bracket edge 122, allowing the display bracket 120, and attached display (not shown), to rotate away from or toward the wall bracket 110, as needed.

The first display bracket edge 121 is moveably coupled to the first wall bracket edge 111 with the curvilinear bar 130 and clamp 140. Interposed the clamp 140 and the first display bracket edge 121 is the clamp bracket 150 and the first hinge 160. Additionally, interposed the curvilinear bar 130 and the first wall bracket edge 121 is the second hinge 170. The curvilinear bar 130 is rotatably coupled with a pin 131 to the second hinge 170 which is coupled to the wall bracket 110. Therefore, as the distance between the first wall bracket edge 111 and the first display bracket edge 121 changes, the curvilinear bar 130 rotates about the pin 131 through the second hinge 170. The pin 131 may be a rivet, a bolt, or other suitable structure that allows the curvilinear bar 130 to rotate.

Figure 2:
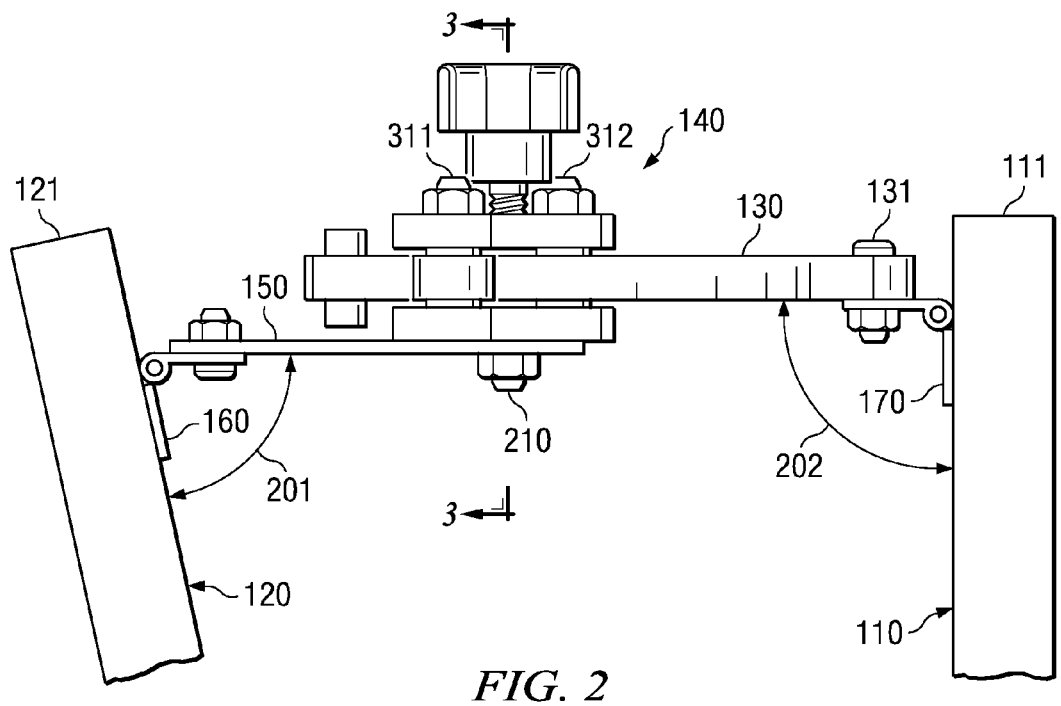
FIG. 2 illustrates a side view of a curvilinear bar, clamp, and clamp bracket mechanism of the display wall mount of FIG. 1 with the display bracket in an intermediate position.

FIG. 2 illustrates a side view of the curvilinear bar 130, clamp 140, and clamp bracket 150 mechanism of the display wall mount 100 of FIG. 1 with the display bracket 120 in an intermediate position. In this view, the relationship of the curvilinear bar 130, the pin 131, the clamp 140, the clamp bracket 150, the first hinge 160, and the second hinge 170 may be more readily seen. This configuration, with the first and second hinges 160, 170 positioned so, enables the clamp 140 and the curvilinear bar 130 to freely adjust a first angle 201 between the clamp bracket 150 and the display bracket 120 and a second angle 202 between the curvilinear bar 130 and the wall bracket 110. Furthermore, the clamp 140 is rotatably coupled to the first hinge 160 with pin 210 so that the clamp 140 may pivot around the pivot pin 210 as the clamp 140 follows the curvilinear bar 130 when the distance between the first wall bracket edge 111 and the first display bracket edge 121 is adjusted.

Figure 3:
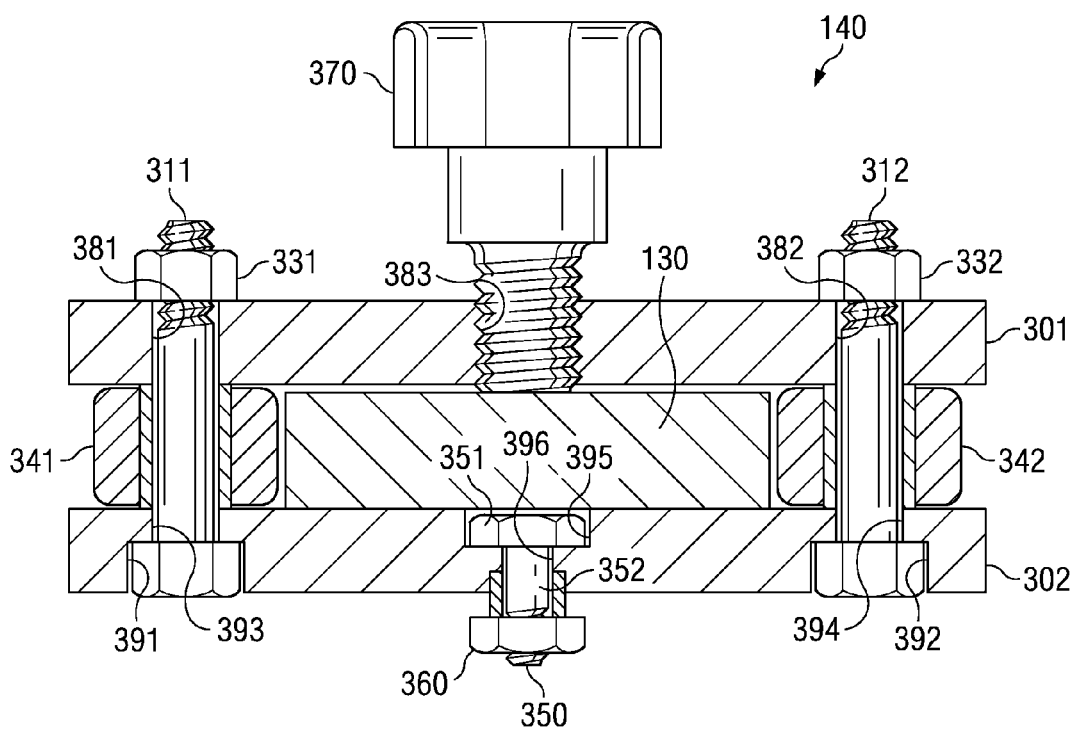
FIG. 3 illustrates a sectional view of one embodiment of the curvilinear bar and clamp taken along a plane passing between bolts 311, 312 as indicated by the section line 3-3 of FIG. 2.

FIG. 3 illustrates a sectional view of one embodiment of the curvilinear bar 130 and clamp 140 taken along a plane passing between bolts 311, 312 as indicated by the section line 3-3 of FIG. 2. In one embodiment, the clamp 140 comprises first and second clamp blocks 301, 302; first and second bolts 311, 312; first and second nuts 331, 332; first and second bearings 341, 342; a pivot bolt 350; a pivot nut 360; and a thumb screw 370. The first clamp block 301 comprises first and second unthreaded apertures 381, 382 and a central threaded aperture 383. The second clamp block 302 comprises first and second recesses 391, 392 that extend as first and second through apertures 393, 394. The second clamp block 302 may further comprise a central recess 395 that extends as a third through aperture 396. In this embodiment, a head 351 of the pivot bolt 350 is housed in central recess 395, and a shank 352 extends through third through aperture 396, capturing one leaf of the first hinge 160 with pivot nut 360. In one embodiment, the pivot nut 360 is a lock nut, and is tightened on the pivot bolt 350 so that the second clamp block 302 may rotate freely with respect to the first hinge 160. Of course, the pivot bolt 350 of this embodiment performs the same function as the pivot pin 210 of FIG. 2. One who is of skill in the art will recognize that other mechanical construction(s) may also be used so long as the second clamp block 302 rotates freely with respect to the first hinge 160. The second leaf of the first hinge 160 is fastened to the display bracket 120 through apertures 361, 362, in one embodiment in a conventional manner. Heads of the first and second bolts 311, 312 are housed in first and second recesses 391, 392, respectively, with the shanks of the first and second bolts 311, 312 extending through first and second through apertures 393, 394, respectively. First and second bearings 341, 342 rotate freely on first and second bolts 311, 312, respectively, and constrain the curvilinear bar 130 which slides within the clamp 140 as tilt of the display bracket 120 is adjusted. The clamp 140 may rotate as needed around pivot bolt 350 with respect to clamp bracket 150 and first hinge 160. When the desired tilt is achieved, thumb screw 370 is tightened in the first clamp block 301 and against the curvilinear bar 130, locking the curvilinear bar 130 in place. As the thumb screw 370 is tightened in the first clamp block 301 against the curvilinear bar 130, the first clamp block 301 slides along the first and second bolts 311, 312 until stopped by first and second nuts 331, 332. In the illustrated embodiment, the first and second pivot pin axes are parallel to each other (pins 131, 210 shown perpendicular to bar 130 in FIGS. 1-5), and orthogonal to the first, second and third hinge axes (pins 131, 210 shown perpendicular to hinge plates of hinges 170, 160 in FIGS. 1-5).

Figure 4A:
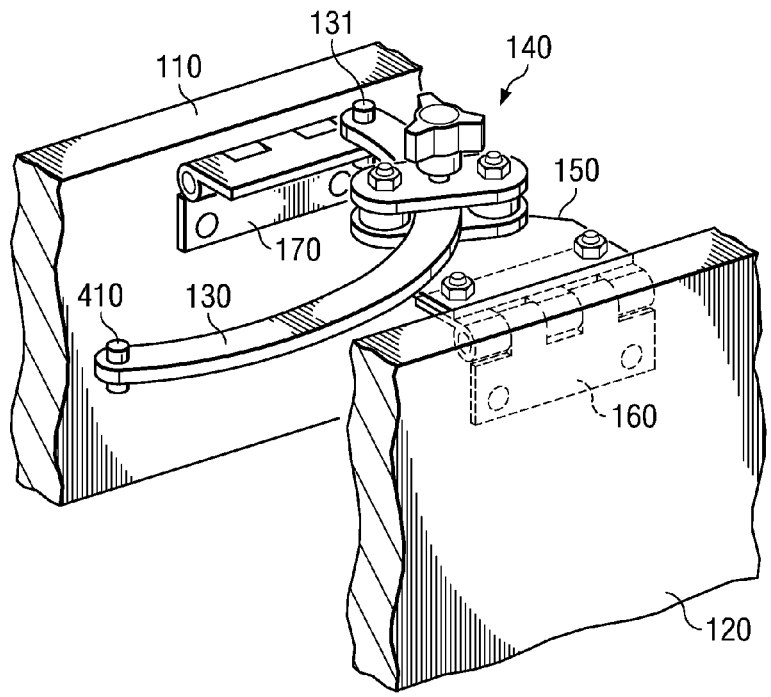
FIG. 4A illustrates the curvilinear bar and clamp mechanism of FIG. 1 with the display bracket in a near vertical position.
Figure 4B:
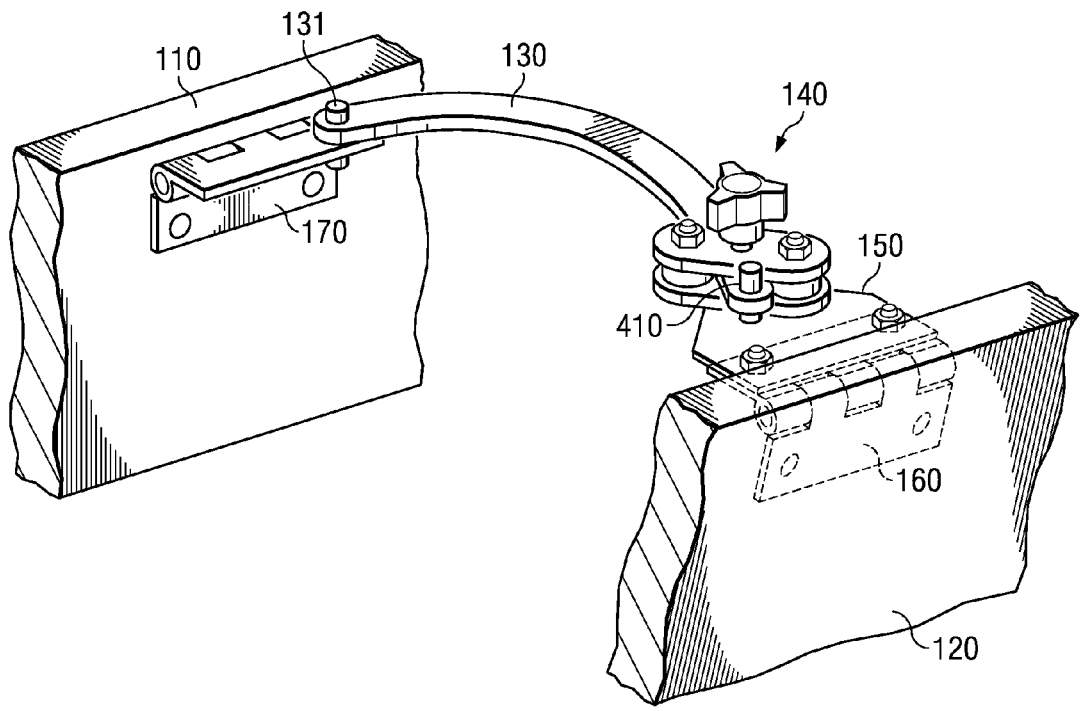
FIG. 4B illustrates the curvilinear bar and clamp mechanism of FIG. 1 with the display bracket in a maximum tilt position.

FIG. 4A illustrates the curvilinear bar 130 and clamp 140 mechanism of FIG. 1 with the display bracket 120 in a near vertical position. FIG. 4B illustrates the curvilinear bar 130 and clamp 140 mechanism of FIG. 1 with the display bracket 120 in a maximum tilt position. In one embodiment, the curvilinear bar 130 may further comprise a stop pin 410 therethrough that prevents the curvilinear bar 130 from slipping all the way out of the clamp 140. As shown in FIG. 4A, the curvilinear bar 130 slides through the clamp 140 and nestles behind the display bracket 120.

Figure 5:
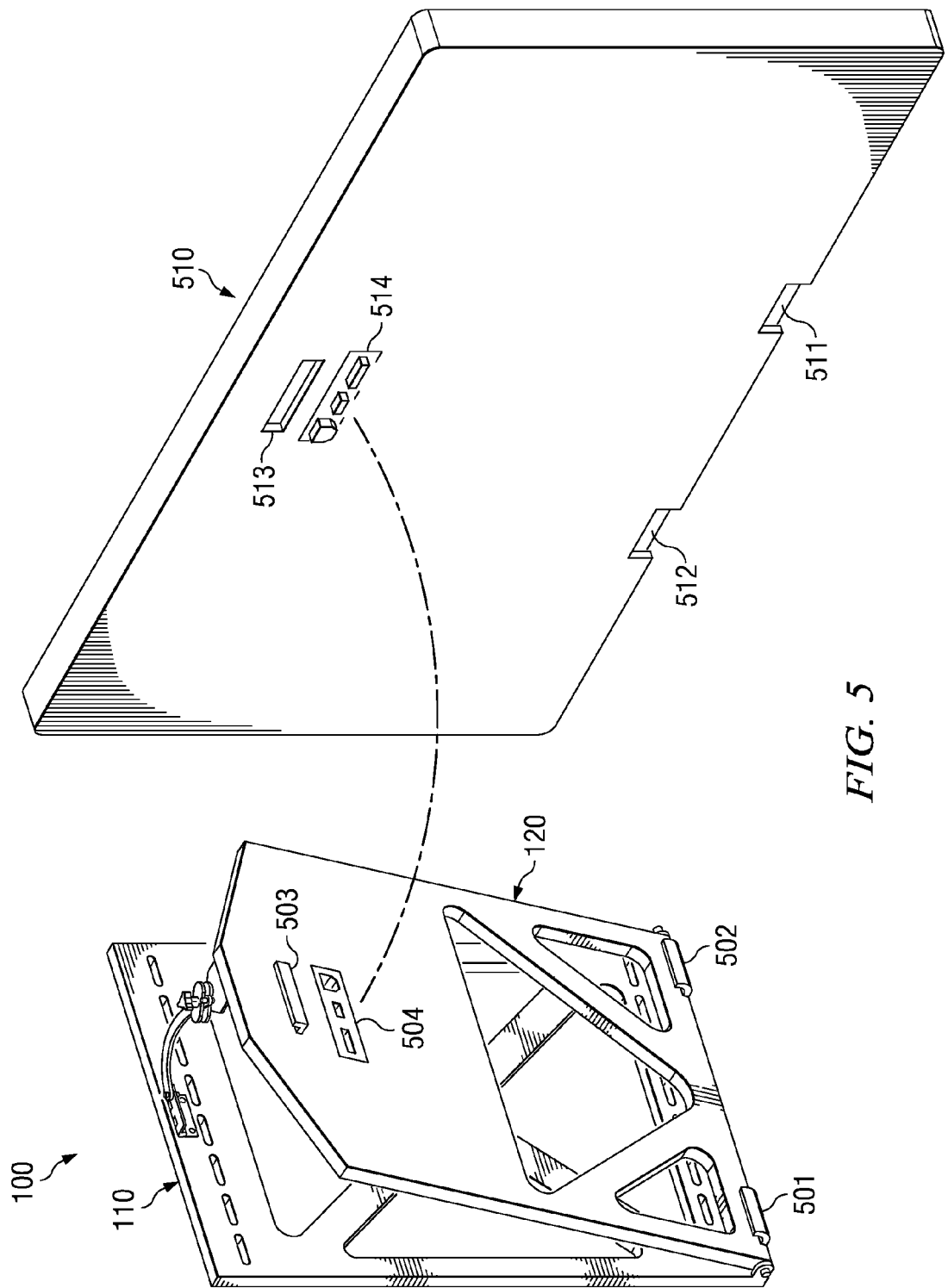
FIG. 5 illustrates an exploded opposition view of the display bracket of FIG. 1 with a representative flat screen television.

FIG. 5 illustrates an exploded opposition view of the display bracket 120 of FIG. 1 with a representative television 510; e.g., a flat screen television. The display bracket 120 further comprises first and second lower mount hooks 501, 502, an upper display catch 503, and a bracket cable connector 504. The display 510 comprises lower mounting slots 511, 512, an upper mounting slot 513, and a display cable connector 514. All necessary cables for power, signal, and external speakers may be readily connected to the bracket cable connector 504 before the display 501 is installed on the mount 100. The first and second lower mount hooks 501, 502 are configured to cooperate with lower mounting slots 511, 512, whereby the display 501 may be placed on the first and second lower mount hooks 501, 502 and then tilted until the upper display catch 503 engages the upper mounting slot 513, locking the display 501 firmly to the display bracket 120. When the upper display catch 503 engages the upper mounting slot 513, the display cable connector 514 engages the bracket cable connector 504, thereby simplifying installation.

It should be noted that with conventional mounts, a wall bracket is mounted to the wall and a separate display bracket is mounted to the display. The two brackets are then joined, which usually requires two persons to manage lifting the display and locating the TV on the wall bracket. However, herein, the wall mount 100 is coupled to the wall and then the flat screen display 510 is coupled to the wall mount 100 as described above. This may usually be accomplished by one person. When installed, the distance between the wall and the display is reduced from between about 3 inches to about 4 inches for a conventional mount; as compared to between about 0.75 inch to 1.25 inches for a mount as described herein. The installation is also simpler because the lower mount hooks 501, 502 and lower mounting slots 511, 512 are easily coupled and the upper display catch 503 automatically engages the upper mounting slot 513 in a positive manner without tools. The TV tilt may then be adjusted to meet the needs of the particular installation and locked in place with the thumb screw as previously explained. The low hinge point for the display bracket attachment to the wall bracket keeps the display 510 as close to the wall as possible; as contrasted to conventional mounts that pivot about the horizontal centerline of the display 510.

The term "providing", as used herein, means that the feature may be obtained from a party having already manufactured the feature, or alternatively may mean manufacturing the feature themselves and providing it for its intended purpose.

Those skilled in the art to which the disclosure relates will appreciate that other and further additions, deletions, substitutions and modifications may be made to the described embodiments without departing from the scope of the disclosure.

What is claimed is:

1. A display wall mount, comprising:
   a planar wall bracket for attachment to a wall;
   a planar display bracket for attachment of a display, the display bracket having a bottom edge pivotally attached to a bottom edge of the wall bracket for relative rotary movement of a display bracket top edge about a first hinge axis toward or away from a wall bracket top edge;
   an arcuate bar having a first end pivotally attached to one of the wall bracket or display bracket for relative rotary movement about a first pivot axis, an intermediate portion, and a second end including a stop; and
   a clamp assembly pivotally attached to the other of the wall bracket or display bracket for relative rotary movement about a second pivot axis; the clamp assembly defining a channel capturing the bar intermediate portion between the first end and the stop during the relative rotary movement about the first pivot axis, and including a manually settable clamping member for releasably securing the bar at a set angular position within the channel.

2. The mount of claim 1, wherein the bar first end is attached to the top edge of one of the wall bracket or display bracket; and the clamp assembly is attached to the top edge of the other of the wall bracket or display bracket.

3. The mount of claim 1, wherein the clamp assembly comprises first and second clamp blocks; and first and second spacers joining the first and second clamp blocks; the channel being defined between the first and second clamp blocks and the first and second spacers.

4. The mount of claim 3, wherein the spacers include bearings; and the bar intermediate portion is captured between the bearings.

5. The mount of claim 4, wherein the spacers include threaded fasteners securing the bearings between the first and second clamp blocks.

6. The mount of claim 5, wherein the manually settable clamping member comprises a thumb screw.

7. The mount of claim 6, wherein the threaded fasteners comprise bolts.

8. The mount of claim 3, wherein the arcuate bar is a flat bar having planar upper and lower surfaces captured between correspondingly planar opposing surfaces of the respective first and second clamp blocks.

9. The mount of claim 1, wherein the bar first end is also pivotally attached to the one bracket for relative rotary movement also about a second hinge axis; and the clamp assembly is also pivotally attached to the other bracket for relative rotary movement also about a third hinge axis.

10. The mount of claim 9, further including a first hinge attaching the bar first end to the one bracket for the relative rotary movement about the second hinge axis; and a second hinge attaching the clamp assembly to the other bracket for the relative movement about the third hinge axis.

11. The mount of claim 10, further including a first pivot pin attaching the bar first end to the first hinge for the relative rotary movement about the first pivot axis; and a second pivot pin attaching the clamp assembly to the second hinge for the relative rotary movement about the second pivot axis.

12. The mount of claim 11, wherein the first and second pivot axes are parallel to each other, and are orthogonal to the first, second and third hinge axes.

13. The mount of claim 12, further including a clamp bracket having a first end attached to the second hinge, and a second end attached to the clamp assembly.

14. The mount of claim 13, wherein the clamp bracket is attached to the clamp assembly by the second pivot pin.

15. The mount of claim 1, wherein the stop is a stop pin.

16. A display wall mount, comprising:
    a planar wall bracket for attachment to a wall;
    a planar display bracket for attachment of a display, the display bracket having a bottom edge pivotally attached to a bottom edge of the wall bracket for relative rotary movement of a display bracket top edge about a first horizontal axis toward or away from a wall bracket top edge;
    a first hinge attached to the top edge of the wall bracket;
    a second hinge attached to the top edge of the display bracket;
    an arcuate bar having a first end, an intermediate portion, and a second end including a stop;
    a first pin member pivotally attaching the bar first end to the first hinge for rotary movement of the bar about a first pivot axis relative to the first hinge, and for rotary movement of the bar about a second horizontal axis relative to the wall bracket;
    a clamp assembly defining a channel capturing the bar intermediate portion between the first end and the stop during the relative rotary movement about the first pivot axis, and including a manually settable clamping member for releasably securing the bar at a set position about the first pivot axis within the channel; and
    a second pin member pivotally attaching the clamping member to the second hinge for rotary movement of the clamping member about a second pivot axis relative to the second hinge, and for rotary movement of the clamping member about a third horizontal axis relative to the display bracket.

17. The mount of claim 16, wherein the clamp assembly comprises first and second clamp blocks; and first and second spacers joining the first and second clamp blocks; the channel being defined between the first and second clamp blocks and the first and second spacers.

18. The mount of claim 17, wherein the spacers include bearings; and the bar intermediate portion is captured between the bearings.

19. The mount of claim 18, wherein the spacers include threaded fasteners securing the bearings between the first and second clamp blocks.

20. The mount of claim 19, wherein the arcuate bar is a flat bar having planar upper and lower surfaces captured between correspondingly planar opposing surfaces of the respective first and second clamp blocks.

21. The mount of claim 20, wherein the manually settable clamping member comprises a thumb screw.

22. The mount of claim 21, wherein the threaded fasteners comprise bolts.

23. The mount of claim 22, wherein the stop is a stop pin.

* * * * *